United States Patent [19]

Kalota et al.

[11] Patent Number: 5,329,020

[45] Date of Patent: Jul. 12, 1994

[54] PREPARATION OF POLYSUCCINIMIDE

[75] Inventors: Dennis J. Kalota, Fenton; David A. Martin, Ballwin, both of Mo.

[73] Assignee: Monsanto Company, St. Louis, Mo.

[21] Appl. No.: 132,022

[22] Filed: Oct. 5, 1993

[51] Int. Cl.$^5$ ............................................. C07D 207/40
[52] U.S. Cl. ..................................................... 548/520
[58] Field of Search ......................................... 548/520

[56] References Cited

U.S. PATENT DOCUMENTS

| | | | |
|---|---|---|---|
| 3,846,380 | 11/1974 | Fujimoto et al. | 260/78 A |
| 4,333,844 | 6/1982 | Duggleby et al. | 252/97 |
| 4,363,797 | 12/1982 | Jacquet et al. | 424/70 |
| 4,407,722 | 10/1983 | Davies et al. | 252/91 |
| 4,428,749 | 1/1984 | Morris | 8/137 |
| 4,971,724 | 11/1990 | Kalota et al. | 252/390 |
| 5,057,597 | 10/1991 | Koskan | 528/328 |
| 5,137,928 | 8/1992 | Erbel et al. | 521/56 |
| 5,219,986 | 6/1993 | Cassata | 530/324 |
| 5,221,733 | 6/1993 | Koskan et al. | 530/333 |

FOREIGN PATENT DOCUMENTS 14775 8/1992 Australia ............................ 530/324

OTHER PUBLICATIONS

"Preparation of Polyaspartic Acids from the Thermal Autocondensation Product of Aspartic Acid" *Experientia*, vol. 9, No. 12, pp. 459–460, 1953, Kovács et al.
"Synthesis of α,β-Poly[2-hydroxyethyl)-DL-aspartamide], a New Plasma Expander" Paola Neri, *Journal of Medicinal Chemistry*, 1973, vol. 16, No. 8.
"Chemical Studies of Polyaspartic Acids", Kovacs et al; J. O. C. S., vol. 26, 1084–1091 (1961).
"Temperature Effect on the Molecular Weight and the Optical Purity of Anhydropolyaspartic Acid Prepared by Thermal Polycondensation" *Bulletin of the Chemical Society of Japan*, vol. 51 (5) 1555–1556 (1978).
National Council on Research and Development (NRCD 8-76) Seawater Desalination 150–157 "The Use of Polymers for Retardation of Scale Formation", Sarig et al. (1976).
"Water-soluble Polyamides as Potential Drug Carriers", Neuse et al, *Die Angewandte Makromolekulare Chemie* 192 35–50 (1991).

*Primary Examiner*—Mary C. Lee
*Assistant Examiner*—Joseph K. McKane
*Attorney, Agent, or Firm*—R. Loyer

[57] ABSTRACT

The present invention relates to a process for the production of polysuccinimide by the thermal condensation of aspartic acid wherein the rate of reaction is increased by contacting the aspartic acid with a gas containing a catalytic amount of carbon dioxide. When the atmosphere in contact with the aspartic acid during the condensation reaction contains about 10 percent, by volume, carbon dioxide, substantially complete conversion to the polymer occurs within about one hour when the reaction is performed in a tray dryer.

17 Claims, 2 Drawing Sheets

PREPARATION OF POLYSUCCINIMIDE

This invention relates to a process for preparing polysuccinimide and the hydrolysis thereof to form polyaspartic acids or salts. More particularly this invention relates to novel processes for preparing polysuccinimide from aspartic acid wherein a catalyst is introduced which causes the acid to react in a thermal condensation reaction at an increased rate.

BACKGROUND OF THE INVENTION

The thermal condensation of alpha amino acids to form polymers with loss of water has been known for many years. Early interest in such processes related to theories for formation of prebiotic polypeptides. For the purpose of testing such theories laboratory experiments used powdered L-aspartic acid, usually packed in the bottom of a flask which was then heated below the melting point of the acid. Such reactions were slow and took place over many hours. One such example is reported by Kokufuta et al. in Bulletin of the Chemical Society of Japan Vol. 51 (5) 1555–1556 (1978) "Temperature Effect on the Molecular Weight and the Optical Purity of Anhydropolyaspartic Acid Prepared by Thermal Polycondensation." The structure of anhydropolyaspartic acid has been thoroughly investigated such as by J. Kovacs et al. in J.O.C.S. Vol. 26 1084–1091 (1961).

In recent years many utilities have been suggested for anhydropolyamino acid. Such polyamides have been suggested as potential drug carriers by Neuse et al. in Die Angewandte Makronmolekulare Chemie 192 35–50 (1991) "Water-soluble polyamides as potential drug carriers." They have also been tested as scale inhibitors with respect to natural sea water and calcium sulfate in particular by Sarig et al. as reported by the National Council on Research and Development (NRCD 8–76, Seawater Desalination 150–157 (1977). Polyaspartic acid has been well known for its ability to disperse solid particles in detergent formulations, having been mentioned as a dispersant in numerous patents, a few of which are U.S. Pat. Nos. 4,363,497; 4,333,844; 4,407,722 and 4,428,749. As a departure from the usual manner of utilizing polyaspartic acid in detergent formulations it is reported in Australian Patent A-14775/92 that the polyamide is added to the wash liquor which, upon hydrolysis in situ, is converted into a biodegradable polypeptide builder. Also, as described in U.S. Pat. No. 4,971,724 to Kalota et al., it has been discovered that compositions comprising polyamino acids such as aspartic acid, when ionized at alkaline pH, effectively inhibit corrosion of ferrous metals in the presence of aqueous medium. Various derivatives of polyamino acids have also been made wherein attributes have been supplied by groups attached to reactive sites on the molecule. One such example is disclosed in U.S. Pat. No. 3,846,380 to Fujimoto et al.

Because of the various impending potential utilities of anhydropolyamino acids, interest in processes for preparing such compounds in large volume, particularly polyaspartic acid, has increased. This interest has resulted in several recent patents being issued which are directed to fluid bed systems; in particular, U.S. Pat. No. 5,219,986 to Cassata. Other such patents are U.S. Pat. Nos. 5,057,597 and 5,221,733 to Koskan and Koskan et al. respectively. In industrial processes for the production of large volumes of product it is highly advantageous to employ a continuous process for obvious reasons. Yet there has not heretofore been devised a convenient, continuous process which provides high quality product. Furthermore, most of the above noted processes require extended reaction times of up to about 10 hours.

There are known attempts to increase the reaction rate in the thermal condensation procedure by employing a catalyst but such attempts, while increasing the reaction rate, do not necessarily increase the efficiency of process because of the need from post reaction steps to isolate the product from the catalyst. One example is found in the Journal of Medicinal Chemistry, 1973, Vol. 16 No 8, pp. 893–897 by P. Neri et al. In this procedure phosphoric acid is employed as a catalyst which requires that the product be dissolved in N,N-dimethylformamide, precipitated and then washed with water several times. A convenient catalyst for the thermal condensation of L-aspartic acid to produce polysuccinimide has not heretofore been found.

BRIEF DESCRIPTION OF THE INVENTION

In accordance with this invention there has been discovered a process for producing polysuccinimide by thermal condensation of aspartic acid in high yield by contacting aspartic acid with a gas containing a catalytic amount of carbon dioxide. It has been discovered that as little as 5 percent carbon dioxide, by volume, in the atmosphere in contact with the reacting acid is sufficient to cause significant increase in reaction rate producing polysuccinimide. Depending upon the reactor configuration the catalytic effect of carbon dioxide gas is provided by maintaining carbon dioxide in the atmosphere in the reactor or by employing carbon dioxide purge gas through the reactor.

In a preferred embodiment of this invention employing a tray dryer, the thermal condensation reaction of aspartic acid to produce polysuccinimide has been found to be 99% complete in one hour or less.

DETAILED DESCRIPTION OF THE INVENTION

In a preferred embodiment, the invention comprises a process for the continuous production of anhydropolyamino acids in high yield by continuously depositing aspartic acid on a plurality of trays in a tray dryer, heating the acid directly by means of internal heaters or indirectly by means of heated gas flow through said dryer to a temperature in the range of from about 200° C. to about 350° C. and continuously withdrawing polysuccinimide from said dryer. With about 10%, by volume, carbon dioxide in the heated gas, the residence time in said dryer is in the range of from about 1 to about 1.25 hours.

A typical tray dryer is commercially produced by Wyssmont Company, Incorporated, Fort Lee, N.J. although any device having the features described herein or equivalent will provide satisfactory results in accordance with this invention.

Another tray dryer which may be employed in the process of this invention is a tray dryer commercially produced by Krauss Maffe of Florence Kentucky. In the Krauss Maffe tray dryer, heated trays are stationary and the reactant is moved across each plate by axially rotating plows or shovels. The reactant alternatively falls from one tray level to the next at the internal or external edge of the tray. The reactant is directly heated by the trays.

Any type of reactor may be employed in the process of this invention. Typical reactors include the List Reactor available from Aerni, A. G. Augst, Switzerland and the Littleford Reactor such as the model FM 130 Laboratory Mixer and larger production models available from the Littleford Bros. Inc., Florence, Ky.

The Littleford mixer provides sufficient agitation to produce a fluid bed condition and may be equipped with a chopper to break up any lumps or clumps of particles that develop and to provide additional shear forces to the fluid bed. The agitation provided by the mixer is sufficient to maintain the particles in a substantially free-flowing state throughout the time period of the reaction. Typically, the Littleford mixer is operated at a temperature of at least about 180° C. and is capable of maintaining the heated bed at a temperature in the range of about 180° C. to about 250° C. or higher for a time sufficient to polymerize the aspartic acid. The mixer is desirably equipped to provide a purge gas stream through the reactor. In accordance with this invention the gas stream is provided with sufficient amounts of carbon dioxide so as to catalyze the condensation reaction, thus greatly reducing the amount of time to reach complete polymerization of the aspartic acid. Typically, the gas stream through the mixer contains at least about 5%, by volume, carbon dioxide and more typically about 10% or greater, by volume.

Any other suitable reactor may be employed in the catalytic process of this invention including those in which the aspartic acid is not agitated severely as is done in the above noted List and Littleford reactors.

To be effective, the gas in contact with the aspartic acid reactant contains at least about 5%, by volume, carbon dioxide to provide an increased reaction rate. Typically, the amount of carbon dioxide in the atmosphere in contact with the aspartic acid reactant is in the range of from about 10% to about 20%, by volume. Of course, as is known in the art, the temperature at which aspartic acid condenses to produce polysuccinimide is above about 190° C. and more usually above about 220° C. Most usually, the catalyzed reaction of this invention is operated in the range of from about 225° C. to about 300° C.

The thermal condensation reaction of aspartic acid in known to occur at the above noted temperatures without agitation. It has been found that tray dryers provide an efficient gas flow system over the reactant at elevated temperature such that the reaction time is cut considerably below that otherwise known. However, the addition of catalytic amounts of carbon dioxide to the heated gas in contact with the aspartic acid in any thermal condensation system has been found to produce polysuccinimide at a faster rate than in the absence of such amounts of carbon dioxide.

Because it has been found to provide a continuous process for the production of polysuccinimide, the use of a tray dryer is the most preferred embodiment of this invention. A more detailed description of such a process is made in conjunction with the attached drawings.

DETAILED DESCRIPTION OF THE DRAWING

Figure 1:
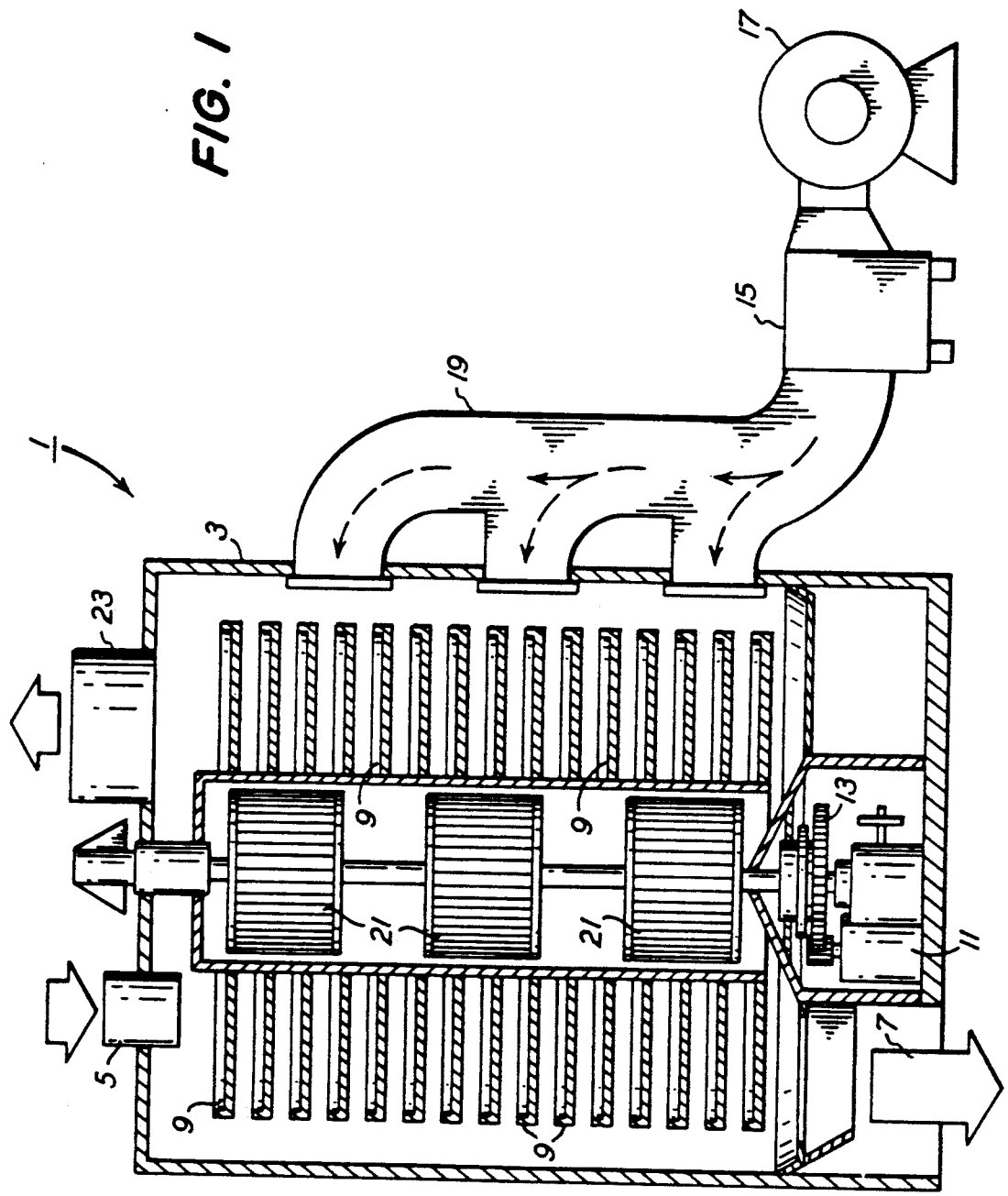
FIG. 1 is a cross sectional side view of a tray dryer useful in the process of this invention.

The process of this invention is best described with reference to FIG. 1 which illustrates a typical tray dryer. In FIG. 1 there is shown tray dryer 1 which comprises an enclosed chamber 3 having apertures for the entry of feed material and the withdrawal of product. In FIG. 1 feed material is introduced into tray dryer 1 through aperture 5 and withdrawn from the apparatus through aperture 7. Trays 9 are situated in a horizontal plane within chamber 3 and are driven by a central power source 11 connected to a central shaft supporting trays 9 through a gear train generally shown as 13 whereby the trays travel in a horizontal direction in a cyclical pattern.

The temperature within chamber 3 is controlled by a heating or cooling means 15 associated with blower 17. The gases being blown by blower 17 through heating or cooling device 15 are then conducted to chamber 3 by means of conduit 19 having multiple ports feeding into said chamber. Axially located within the rotating tray support are fans 21 which circulate air through and between trays 9 throughout chamber 3 thereby maintaining a relatively constant temperature throughout the chamber. Gases are allowed to escape the chamber through aperture 23.

Figure 2:
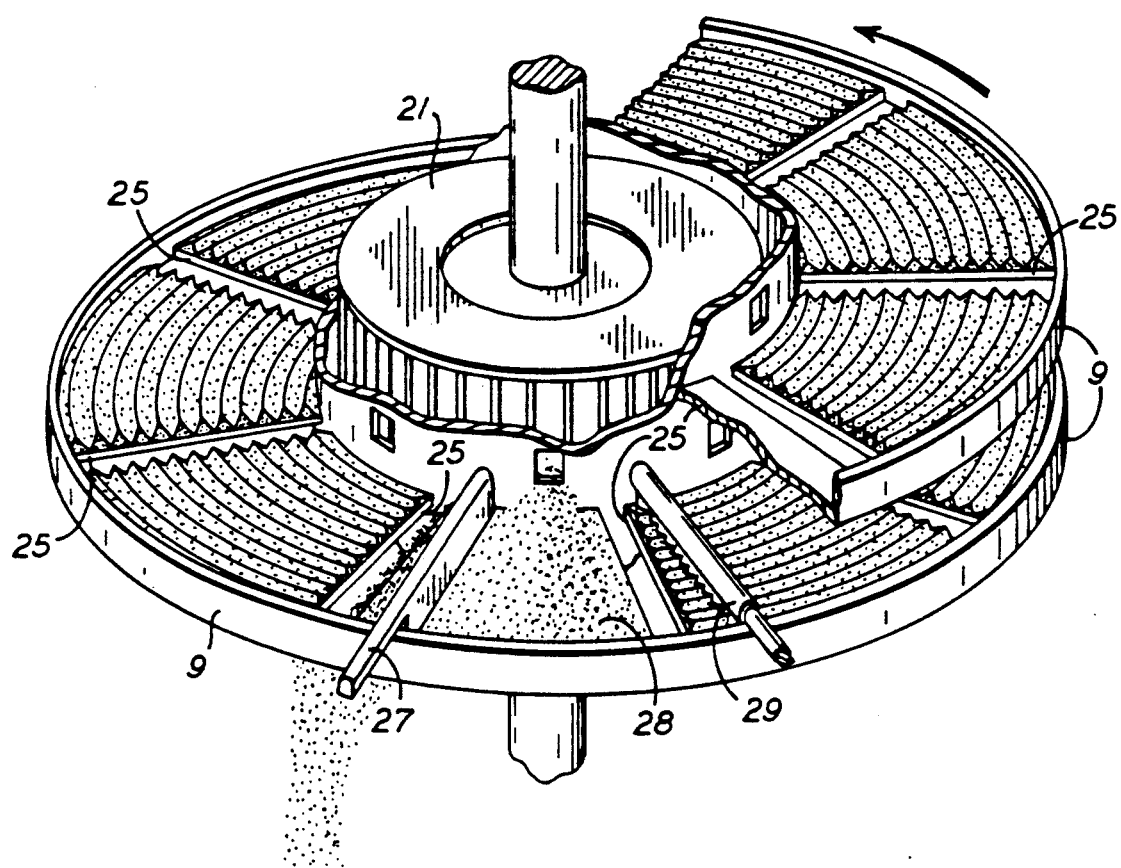
FIG. 2 is a plane view of an array of trays in a horizontal plane of the tray dryer of FIG. 1.

In operation, feed material enters chamber 3 through aperture 5 and falls upon an array of rotating trays 9 shown in more detail in FIG. 2. The feed rate controls the bed depth on the trays. Typically, the bed depth in the process of this invention is usually up to about 7.6 cm while a range of from about 2.5 cm to about 5 cm has been found to be advantageous. As may be expected, reaction time increases with bed depth but the relationship is not proportional. That is, an increase in bed depth of from 2.5 cm to 5 cm does not double the reaction time. It has been found that such an increase in bed depth from 2.5 to 5 cm results in an increase in reaction time of about one-third.

As shown in FIG. 2 the horizontal array of trays 9 contains a series of slots or openings 25. The trays rotate as indicated by the arrows in FIG. 2. A stationary wiper bar 27 causes the material deposited on trays 9 to be removed by being pushed off of each tray 9 through the adjacent opening or slot. Fresh material, shown in FIG. 2 as a pile 28, is deposited immediately behind stationary wiper bar 27. Tray 9, carrying the pile, passes under a stationary leveling bar 29 to assure a uniform coating over tray 9. In FIG. 2 there is shown fan 21 which provides circulation of the gas, typically air, within chamber 3 to be continuously circulated to assure that the material on tray 9 is contacted with gases within chamber 3 which are at a fairly uniform temperature.

As shown in FIG. 1 the series of trays 9 deliver material in descending order by passing the material from one array of trays to the other in seriatim until the material reaches the bottom tray and is thus delivered to the exit aperture 7 as final product from the dryer.

Trays 9 can be spaced at variable heights from one another and, of course, the number of trays can be varied within chamber 3. Also, the speed of rotation of the array of trays can be controlled. Typically, the array of trays 9 travels at from 1 to 10 minutes per revolution and, in the process of this invention, is usually set to travel at from 3 to 6 minutes per revolution. The total residence time of material in the dryer apparatus is controlled by adjusting the number of arrays of trays, the distance between each array and the speed of rotation of the trays.

There is thus provided a convenient, continuous process for making a polysuccinimide by continuously feeding an aspartic acid reactant such as an L-aspartic acid to dryer 1 through aperture 5 and allowing it to proceed tray array to tray array until the polymerized material continuously exits from the apparatus.

Description of the Preferred Embodiments

EXAMPLE 1

A List Reactor, commercially available from the Aerni, A. G. Augst, Switzerland was employed which contains an agitation means comprising rotating vanes mounted on a horizontal axis. Into the reactor was placed 500.9 g of L-aspartic acid. The wall temperature of the reactor was initially set at 260° C. and two hours after charging the reactor it was raised to 290° C. The reactor was run at a slight vacuum to allow the flow of gas through the reactor. Carbon dioxide from evaporating dry ice was fed to the reactor as the purge gas being pulled through the reactor. The internal temperature was measured and recorded as noted below in Table I. Also, samples or the reaction mixture were taken hourly and analyzed for the amount of conversion to polymer and its molecular weight. The APHA color index of a 0.5% solution of the sample was measured. The results of experiment are shown in Table I below.

TABLE 1

| Sample No. | Color APHA | Int. Temp. °C. | Mol. wt. | React. Time (Hr.) | % Conv. Polymer |
|---|---|---|---|---|---|
| 1 | 13 | 234 | 7475 | 1 | 7.39 |
| 2 | 61 | 227 | 8980 | 2 | 27.97 |
| 3 | 100 | 250 | 9460 | 3 | 54.39 |
| 4 | 134 | 250 | 9745 | 4 | 91.28 |
| 5 | 198 | 250 | 9960 | 6 | >100.0 |
| 6 | 242 | 250 | 9815 | 7 | >100 |
| 7 | 263 | 251 | 9815 | 8 | >100.0 |

EXAMPLE 2

The procedure of Example 1 was repeated with the exception that nitrogen was employed as the purge gas circulated though the reactor. Samples were taken hourly and the results of the analysis appear below in Table II.

TABLE II

| Sample No. | Color APHA | Int. Temp. °C. | Mol. wt. | React. Time (Hr.) | % Conv. Polymer |
|---|---|---|---|---|---|
| 1 | 35 | 331 | | 1 | 0 |
| 2 | 66 | 228 | 9368 | 2 | 27.89 |
| 3 | 74 | 250 | 9717 | 3 | 50.45 |
| 4 | 155 | 250 | 9861 | 4 | 66.86 |
| 5 | 198 | 250 | 10,153 | 6 | 88.19 |
| 6 | 244 | 251 | 9933 | 7 | 100.0 |
| 7 | | 248 | 9860 | 8 | 100.0 |

EXAMPLE 3

In the following examples, a laboratory model was employed having two trays which periodically transfer material from one to the other simulating the conditions of the tray dryer described above with respect to FIGS. 1 and 2. The reactant material was passed from one tray to the other so as to equal the desired number of tray levels as shown in FIG. 1 above. The tray dryer, simulating the Wyssmont Turbo Dryer, available from the Wyssmont Company, Fort Lee, N.J. was operated with the addition of 1 kg of L-aspartic acid per tray level at a depth of 2.5 cm on the trays. A total of 28 tray levels was employed. Circulated air temperature through the dryer of 305° C. was maintained throughout the experiment. Air velocity was maintained at 114.3 meters per minute and tray rotation was set at 3 minutes per revolution. An amount of carbon dioxide was fed into the air supply to provide a total amount of 10 percent, by volume, carbon dioxide in the air contacting the material on the trays. Samples were taken from the trays at various reaction times and analyzed for the amount of conversion to polymer, pH, color (APHA), and molecular weight. The data obtained appears in Table III below.

TABLE III

| Sample No. | Time (min) | Mol. wt. | Color | pH | % Conv. Polymer |
|---|---|---|---|---|---|
| 1 | 30 | 9402 | 112 | 9.17 | 53.66 |
| 2 | 64 | 9333 | 471 | 9.82 | 99.00 |
| 3 | 70 | 9263 | 565 | 9.26 | 99.06 |
| 4 | 90 | 8792 | 1069 | 10.01 | 99.16 |

EXAMPLE 4

Example 3 was repeated with the exception that only ambient air, heated to 305° C., was circulated through the dryer and a total of 41 trays was employed in the dryer. Samples taken at various stages were analyzed as noted above and the results appears in Table IV below.

TABLE IV

| Sample No. | Time (min) | Mol. wt. | Color | pH | % Conv. Polymer |
|---|---|---|---|---|---|
| 1 | 50 | 9466 | 119 | 9.09 | 64.73 |
| 2 | 70 | 9538 | 277 | 9.19 | 93.90 |
| 3 | 90 | 9466 | 367 | 10.60 | 98.66 |
| 4 | 100 | 9052 | 645 | 9.16 | 99.54 |
| 5 | 116 | 8638 | 984 | 9.06 | 100.00 |
| 6 | 130 | 8525 | 1052 | 9.12 | 100.00 |

The products from the above examples were hydrolyzed in basic aqueous solution to form the sodium salt of polyaspartic acid having a majority of beta linkages in the polymer and a minority of alpha linkages. The optimum base employed was sodium hydroxide in 12.75% solution.

What is claimed is:

1. A process for the production of polysuccinimide by the thermal condensation of aspartic acid at elevated temperatures which comprises contacting the aspartic acid with a gas containing a catalytic amount of carbon dioxide.

2. The process of claim 1 wherein the aspartic acid is agitated.

3. The process of claim 2 wherein the agitation provides a fluid bed.

4. In a process for the continuous production of polysuccinimide in high yield comprising continuously depositing an aspartic acid on a plurality of trays at different levels in a tray dryer wherein the material is forced from trays in upper levels to trays in lower levels, heating the alpha amino acid to a temperature in the range of from about 200° C. to about 300° C. and continuously withdrawing anhydropolyamino acid from said dryer, the improvement which comprises contacting the aspartic acid with a gas containing a catalytic amount of carbon dioxide whereby the rate of reaction is increased.

5. The process of claim 1 wherein the carbon dioxide is present in at least about 5%, by volume, in the gas.

6. The process of claim 5 further including the step of hydrolyzing the polysuccinimide in alkaline solution to produce polyamino acid salt.

7. The process of claim 4 wherein the tray dryer is a tray dryer wherein the tray travel in a horizontal plane and the carbon dioxide content of the gas is about 10%, by volume.

8. The process claim 7 wherein said tray dryer is directly heated and carbon dioxide is fed into the dryer.

9. The process of claim 7 wherein said tray dryer is indirectly heated by a flow of heated gas through said dryer.

10. The process of claim 4 wherein the gas temperature is in the range of from about 240° C. to about 320° C.

11. The process of claim 1 wherein the molecular weight of said polysuccinimide is in the range of from about 7,200 to about 8,500.

12. The process of claim 4 wherein the trays of said dryer travel at a rate of about 3 minutes to about 12 minutes per cycle.

13. The process of claim 4 wherein the bed depth of the aspartic acid is in the range of from about 2.5 cm to about 7.6 cm.

14. The process of claim 4 wherein the bed depth of the aspartic acid is about 2.5 cm.

15. In a process for producing polysuccinimide in relatively high yields comprising the steps of:
   a) providing an agitated, fluid bed constituted by freely flowing, solid, particulate aspartic acid;
   b) heating the fluid bed to a temperature of at least about 180° C. and maintaining the heated bed at a temperature in the range of from about 180° C. to about 250° C. for a time sufficient to polymerize the aspartic acid and to drive off water from the heated bed whereby the degree of agitation is sufficient to maintain the particles in a substantially free-flowing state throughout the time period, and
   c) recovering the polysuccinimide from the fluid bed, the improvement which comprises contacting the aspartic acid in the fluid bed with a catalytic amount of carbon dioxide whereby the reaction rate is increased.

16. The process of claim 15 further comprising hydrolyzing the polysuccinimide to produce polyaspartic acid.

17. The process of claim 15 wherein the carbon dioxide comprises at least about 5% of the gas contacting the aspartic acid.

* * * * *